(12) United States Patent
Gomi et al.

(10) Patent No.: US 10,100,466 B2
(45) Date of Patent: Oct. 16, 2018

(54) SHEET MANUFACTURING APPARATUS

(71) Applicant: SEIKO EPSON CORPORATION, Tokyo (JP)

(72) Inventors: Katsuhito Gomi, Matsumoto (JP); Shigeo Fujita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 81 days.

(21) Appl. No.: 15/057,514

(22) Filed: Mar. 1, 2016

(65) Prior Publication Data
US 2016/0258112 A1 Sep. 8, 2016

(30) Foreign Application Priority Data

Mar. 6, 2015 (JP) ................................. 2015-044374

(51) Int. Cl.
| | |
|---|---|
| D21F 9/00 | (2006.01) |
| D21B 1/06 | (2006.01) |
| D21F 7/00 | (2006.01) |
| D21B 1/10 | (2006.01) |

(52) U.S. Cl.
CPC ............. *D21F 9/00* (2013.01); *D21B 1/061* (2013.01); *D21B 1/063* (2013.01); *D21B 1/10* (2013.01); *D21F 7/006* (2013.01); *Y02W 30/644* (2015.05)

(58) Field of Classification Search
CPC .......... D21F 9/00; D21F 7/006; D21B 1/061; D21B 1/063; D21H 1/14
See application file for complete search history.

(56) References Cited

U.S. PATENT DOCUMENTS

| | | | | |
|---|---|---|---|---|
| 4,904,439 A | * | 2/1990 | Farrington | ................ D21F 9/00 264/113 |
| 6,524,443 B2 | * | 2/2003 | Doelle | ..................... B26D 7/18 162/264 |
| 2009/0178774 A1 | | 7/2009 | Brambilla | |
| 2014/0027075 A1 | * | 1/2014 | Yamagami | ............... D21B 1/08 162/4 |

FOREIGN PATENT DOCUMENTS

| | | |
|---|---|---|
| EP | 1746201 | 1/2007 |
| EP | 2784210 | 10/2014 |
| JP | 50-69306 | 6/1975 |
| JP | 08-013379 | 1/1996 |
| JP | 08-141823 | 6/1996 |
| JP | 09-300368 | 11/1997 |

OTHER PUBLICATIONS

European Search Report for Application No. 16158264.8 dated Aug. 1, 2016.

* cited by examiner

*Primary Examiner* — Alison L Hindenlang
*Assistant Examiner* — Mohamed K Ahmed Ali
(74) *Attorney, Agent, or Firm* — Workman Nydegger

(57) ABSTRACT

A sheet manufacturing apparatus includes a crusher unit, a defibrator unit, a second web forming unit, and a shaping unit. The crusher unit coarsely crushes a raw material that contains fibers into coarsely crushed pieces. The defibrator unit defibrates coarsely crushed pieces into defibrated material. The second web forming unit forms a web by accumulating defibrated material. The shaping unit forms a sheet from the web. The crusher unit is positioned vertically below the shaping unit.

11 Claims, 5 Drawing Sheets

SHEET MANUFACTURING APPARATUS

BACKGROUND

1. Technical Field

The present invention relates to a sheet manufacturing apparatus.

2. Related Art

Technologies for manufacturing paper in a dry method by using waste paper as a raw material have been disclosed (see JP-A-50-69306). A waste paper recycling apparatus shown in FIG. 1 in JP-A-50-69306 has a one-line configuration in which a turbo cutter (coarse fiber crusher), a turbo mill that performs disintegration, preparation, and mixture in a dry process, a cyclone that removes undesired matters, a screen that removes undefibrated fiber and the like, a sheet forming apparatus that forms a sheet, a pick-up apparatus, a smooth presser, a dryer unit, and a pope reel are arranged in a line.

However, the waste paper recycling apparatus described in JP-A-50-69306, due to having a one-line configuration in which all the process units are arranged in a line, is horizontally long, so that, while being able to be installed in factories and the like without a problem, the waste paper recycling apparatus suffers from a problem of being large in size when the apparatus is to be installed in an office, a relatively small vacant shape in a warehouse, etc.

SUMMARY

An advantage of some aspects of the invention is that a sheet manufacturing apparatus whose foot print (installation area) is small and therefore improves ease of installation is provided.

This advantage can be at least partially achieved by the following aspect and embodiments of the invention.

A sheet manufacturing apparatus according to an aspect of the invention includes a crusher unit configured to coarsely crush raw material that contains fiber into coarsely crushed pieces, a defibrator unit configured to defibrate coarsely crushed pieces into defibrated material, a web forming unit configured to form a web by accumulating defibrated material, and a shaping unit configured to form a sheet from the web. The crusher unit is positioned vertically below the shaping unit.

In this sheet manufacturing apparatus, since the crusher unit is disposed in a space below the shaping unit, waste space can be made as small as possible and therefore the installation area of the sheet manufacturing apparatus can be minimized.

In the sheet manufacturing apparatus described above, the shaping unit may include a cutter unit configured to cut off a side end portion of the sheet which extends in a transport direction in which the sheet is transported, and at least a portion of the crusher unit may be positioned vertically below the cutter unit.

In this sheet manufacturing apparatus, the remnants produced in the cutter unit can be introduced into the crusher unit by gravity for reuse.

In the forgoing sheet manufacturing apparatus according to the invention, the shaping unit may include a pressurization unit configured to pressurize the web, a heater unit configured to heat the web pressurized by the pressurization unit, and a cutter unit configured to cut the sheet obtained by heating the web by the heater unit, and the crusher unit may be positioned vertically below the heater unit and the cutter unit.

In this sheet manufacturing apparatus, maintenance of the pressurization unit can be easily performed even though the crusher unit is disposed vertically below the shaping unit.

This sheet manufacturing apparatus may further include a receiver unit provided vertically below the pressurization unit, the heater unit, and the cutter unit and the receiver unit may guide paper powder produced in the shaping unit to a defibrator unit side.

In this sheet manufacturing apparatus, the paper powder produced in the shaping unit can also be reused.

The foregoing sheet manufacturing apparatus may further include a supplying unit configured to hold the raw material and to supply the raw material to the crusher unit and a discharge unit configured to hold the sheet formed by the shaping unit. Furthermore, the supplying unit may be positioned at a first side wall of a casing of the sheet manufacturing apparatus and the discharge unit may be positioned at a second side wall continuous to the first side wall of the casing of the sheet manufacturing apparatus.

This sheet manufacturing apparatus is convenient for users.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred exemplary embodiments of the invention will be described in detail hereinafter with reference to the drawings. It is to be noted that the exemplary embodiments described below are not meant to unduly limit the contents of the invention described in the appended claims. Also note that it is not necessarily the case that all the configurations and the like described below are indispensable constituent features of the invention.

A sheet manufacturing apparatus according to an exemplary embodiment includes a crusher unit that coarsely crushes raw material that contains fiber into coarsely crushed pieces, a defibrator unit that defibrates coarsely crushed pieces into defibrated material, a web forming unit that forms a web by accumulating defibrated material, and a shaping unit that forms a sheet from the web. The coarse crusher unit is disposed vertically below the shaping unit.

1. Sheet Manufacturing Apparatus 1.1. Configuration

Figure 1:
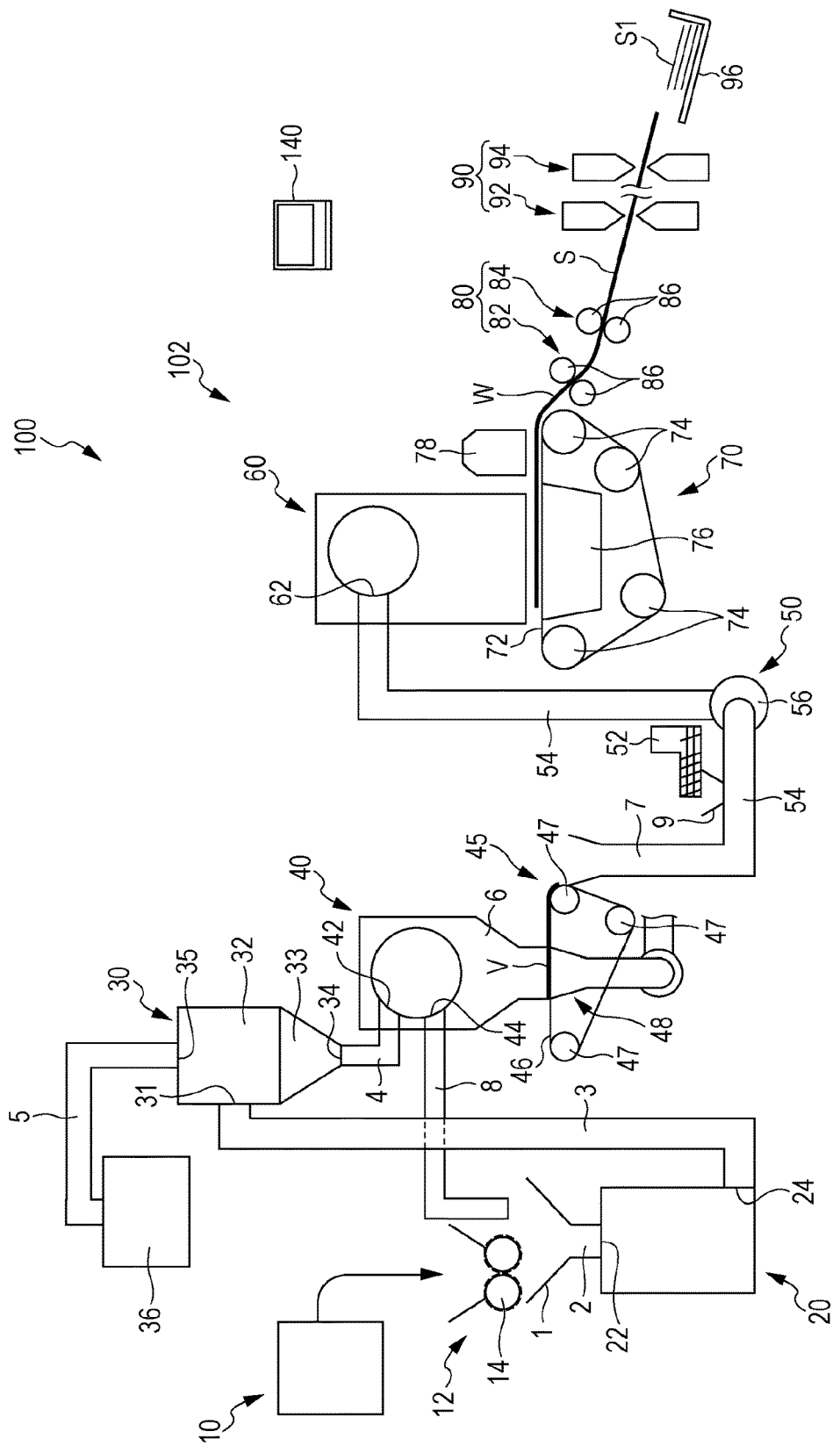
FIG. 1 is a schematic diagram of a sheet manufacturing apparatus according to an exemplary embodiment of the invention.

First, a sheet manufacturing apparatus according to an exemplary embodiment of the invention will be described with reference to drawings. FIG. 1 is a schematic diagram of a sheet manufacturing apparatus 100 according to the exemplary embodiment.

The sheet manufacturing apparatus 100, as shown in FIG. 1, includes a supplying unit 10, a manufacturing unit 102, and a control unit 140. The manufacturing unit 102 manufactures a sheet. The manufacturing unit 102 includes a coarse crusher unit 12, a defibrator unit 20, a classifier unit 30, a screening unit 40, a first web forming unit 45, a mixer unit 50, an accumulation unit 60, a second web forming unit 70, a sheet forming unit 80, and a cutter unit 90.

The supplying unit 10 supplies a raw material to the coarse crusher unit 12. The supplying unit 10 is, for example, an automatic feeding unit for continuously feeding the raw material into the coarse crusher unit 12. The raw material supplied by the supplying unit 10 is, for example, a material that contains fiber of waste paper, pulp sheets, etc.

The coarse crusher unit 12 cuts the raw material supplied by the supplying unit 10 into small pieces in the air. As for the shape and size of the small pieces, the pieces are, for example, several centimeters by several centimeters. In the example shown in FIG. 1, the coarse crusher unit 12 includes a coarse crusher blade 14. By the coarse crusher blade 14, the raw material fed into the coarse crusher unit 12 can be cut. The coarse crusher unit 12 is, for example, a shredder. The raw material cut by the coarse crusher unit 12 is received by a hopper 1 and then transferred (transported) to the defibrator unit 20 through a pipe 2.

The defibrator unit 20 defibrates the raw material cut by the coarse crusher unit 12. Note that the "defibrate" means to disentangle a raw material (defibration object) in which a plurality of fibers are bound into separate individual fibers. The defibrator unit 20 also has a function of separating substances, such as resin particles, ink, toner, or a blur-preventing agent adhering to the raw material, from the fibers.

The material that has passed through the defibrator unit 20 is referred to as "defibrated material". In some cases, the "defibrated material" contains not only defibrated material fibers that have been disentangled but also resin particles (particles of a resin for binding fibers) separated from the fibers at the time of disentangling the fibers, coloring agents such as ink or toner, additives such as a blur-preventing material or a paper strength additive. The shape of disentangled pieces of the defibrated material is a string shape or a ribbon shape. The disentangled defibrated material may be in a state in which the material is not intertwined with the other disentangled fibers (independent state) and may also be in a state in which the disentangled defibrated material is tangled with other disentangled fibers (a state in which so-called "lumps" have been formed).

The defibrator unit 20 performs defibration in a dry process in the atmosphere (air). Concretely, the defibrator unit 20 used is an impeller mill. The defibrator unit 20 has a function of sucking the raw material to produce an air stream that discharges the defibrated material. Therefore, due to the air stream that the defibrator unit 20 produces, the defibrator unit 20 can suck the raw material from the introduction port 22 together with the air stream, perform the defibration process, and transport the defibrated material to the discharge port 24. The defibrated material that has passed through the defibrator unit 20 is transferred to the classifier unit 30 through a pipe 3.

The classifier unit 30 classifies the defibrated material that has passed through the defibrator unit 20. Concretely, the classifier unit 30 separates and removes from the defibrated material substances that are relatively small in size or low in density (resin particles, coloring agents, additives, etc.) This process increases the proportion of fibers that are relatively large in size or high in density in the defibrated material.

As the classifier unit 30, an air stream-type classifier is used. The air stream-type classifier produces a swirling air stream to separate substances to be classified according to different centrifugal forces on the substances based on their sizes and densities. By adjusting the speed of the air stream and the centrifugal force, the classification point can be adjusted. Concretely, as the classifier unit 30, a cyclone, an elbow jet, an eddy classifier, etc. may be used. In particular, a cyclone as shown in drawings is simple in structure and can be suitably used as the classifier unit 30.

The classifier unit 30 includes, for example, an introduction port 31, a cylindrical portion 32 to which the introduction port 31 is connected, an inverted cone-shaped portion 33 provided under and extending continuously from the cylindrical portion 32, a lower discharge port 34 provided in a center portion of a lower portion of the inverted cone-shaped portion 33, and an upper discharge port 35 provided in a center portion of an upper portion of the cylindrical portion 32.

In the classifier unit 30, the air stream introduced through the introduction port 31 and carrying defibrated material changes into circumferential motion in the cylindrical portion 32. Due to this, the introduced defibrated material is subjected to centrifugal force, so that the classifier unit 30 is able to separate the defibrated material into fibers that are larger in size and higher in density than resin particles and ink particles (first classified material) and resin particles, coloring agents, additives, etc. that are smaller in size and lower in density than the fibers (second classified material). The first classified material is discharged from the lower discharge port 34 into a pipe 4 and then introduced into the screening unit 40. On the other hand, the second classified material is discharged from the upper discharge port 35 into a dust collector unit 36 via a pipe 5.

The screening unit 40 introduces through an introduction port 42 the first classified material (the defibrated material having been defibrated by the defibrator unit 20) that has passed through the classifier unit 30, and then screens the first classified material according to the lengths of the fibers. The screening unit 40 is, for example, a sieve. The screening unit 40 has a mesh (a filter, a screen) and is able to separate the first classified material into fibers or particles that are smaller than the size of the aperture of the mesh (materials that pass through the mesh, referred to as "first screened material") and fibers, undefibrated pieces, and lumps which are larger than the size of the aperture of the mesh (substances that do not pass through the mesh, referred to as "second screened material"). For example, the first screened material is received by a hopper 6 and then is transferred to the mixer unit 50 through a pipe 7. The second screened material is returned from the discharge port 44 to the defibrator unit 20 through a pipe 8. Concretely, the screening unit 40 is a cylindrical sieve capable of being rotated by a motor. The mesh of the screening unit 40 is, for example, a metal mesh, an expanded metal formed by stretching a slitted metal sheet, or a punched metal formed by perforating a metal sheet with a press machine or the like.

The first web forming unit 45 transports the first screened material that has passed through the screening unit 40 to the mixer unit 50. The first web forming unit 45 includes a mesh belt 46, tension rollers 47, and a suction unit (suction mechanism) 48.

The suction unit 48 is able to draw onto the mesh belt 46 the first screened material having passed through an opening (a mesh opening) of the screening unit 40 and dispersed in air. The first screened material accumulates on the mesh belt 46 in motion to form a web V. The basic configurations of the mesh belt 46, the tension rollers 47, and the suction unit 48 are substantially the same as those of a mesh belt 72, tension rollers 74, and a suction mechanism 76 of the second web forming unit 70 (described later).

The web V, because of having passed through the screening unit 40 and the first web forming unit 45, forms so as to contain a large amount of air and therefore be soft and swollen. The web V accumulated on the mesh belt 46 is fed into the pipe 7 and then transported to the mixer unit 50.

The mixer unit 50 mixes the first screened material having passed through the screening unit 40 (the first screened material having been transported by the first web forming unit 45) and an additive that contains a resin. The mixer unit 50 includes an additive supplying unit 52 that supplies the additive, a pipe 54 for transporting the additive and the first screened material, and a blower 56. In the example shown in FIG. 1, the additive is supplied from the additive supplying unit 52 into the pipe 54 via a hopper 9. The pipe 54 is continuous to the pipe 7.

The mixer unit 50 produces an air stream by using the blower 56 so that the first screened material and the additive can be mixed in the pipe 54 and transported through the pipe 54. Incidentally, the mechanism that mixes the first screened material and the additive is not particularly limited but may be, for example, a mechanism that stirs the first screened material and the additive by using blades that turn at high speed or a mechanism such as a V-shape mixer that utilizes rotation of a container.

The additive supplying unit 52 may be, for example, a screw feeder as shown in FIG. 1, a disc feeder (not shown), etc. The additive supplied from the additive supplying unit 52 includes a resin for binding a plurality of fibers. At the time point when the resin is supplied, the plurality of fibers are not bound yet. The resin melts and binds the fibers when passing through the sheet forming unit 80.

The resin supplied from the additive supplying unit 52 is a thermoplastic resin or a thermosetting resin. Examples of the resin include AS resin, ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, polyether ether ketone, etc. These resins may be used singly or in an appropriate mixture. The additive supplied from the additive supplying unit 52 may be in a fibrous state or a powder state.

Incidentally, the additive supplied from the additive supplying unit 52 may contain, besides the resin for binding fibers, a colorant for coloring the fibers, an aggregation preventing material for preventing aggregation of fibers, or a flame retardant for making the fibers and the like less easy to burn according to the kind of the sheet to be manufactured. The mixture having passed through the mixer unit 50 (the mixture of the first screened material and the additive) is transferred to the accumulation unit 60 through the pipe 54.

The accumulation unit 60 introduces the mixture having passed through the mixer unit 50 from the introduction port 62, unravels the intertwined defibrated material (fibers), and then causes the unraveled fibers to fall while dispersing in air. Furthermore, if the resin in the additive supplied from the additive supplying unit 52 is fibrous, the accumulation unit 60 unravels the intertwined resin. Due to this, the accumulation unit 60 is able to cause the mixture to accumulate in the second web forming unit 70 with high uniformity.

The accumulation unit 60 in this example is a cylindrical sieve that rotates. The accumulation unit 60 includes a mesh and allows fibers or particles that are contained in the mixture having passed through the mixer unit 50 and that are smaller than the aperture size of the mesh (the fibers or particles that pass through the mesh) to fall. The configuration of the accumulation unit 60 is, for example, the same as the configuration of the screening unit 40.

Note that the "sieve" of the accumulation unit 60 does not need to have a function of screening a specific object. Specifically, the "sieve" used as the accumulation unit 60 means an element that includes a mesh, and the accumulation unit 60 may allow all the mixture introduced into the accumulation unit 60 to fall.

The second web forming unit 70 accumulates the material having passed through the accumulation unit 60 so as to form the web W. The second web forming unit 70 includes, for example, the mesh belt 72, the tension rollers 74, and the suction mechanism 76.

The mesh belt 72, while moving, accumulates the material that has passed through the opening (aperture of the mesh) of the accumulation unit 60. The mesh belt 72 is supported with tension by the tension rollers 74 and is configured so as not to easily allow the material having come through the opening to pass through but so as to allow air to pass through. The mesh belt 72 moves as the tension rollers 74 rotate about their own axes. While the mesh belt 72 continuously moves, the material having passed through the accumulation unit 60 continuously falls and accumulates on the mesh belt 72 to form the web W on the mesh belt 72. The mesh belt 72 is made of, for example, a metal, a resin, a cloth, a non-woven fabric, etc.

The suction mechanism 76 is provided below the mesh belt 72 (provided at the opposite side to the accumulation unit 60). The suction mechanism 76 is capable of producing a downward air stream (air stream toward the mesh belt 72 from the accumulation unit 60). Due to the suction mechanism 76, the mixture dispersed in air by the accumulation unit 60 can be drawn onto the mesh belt 72. Therefore, the speed of discharge from the accumulation unit 60 can be made high. Furthermore, due to the suction mechanism 76, a fall path of the mixture can be provided with downward air flow, so that the defibrated material and the additive can be prevented from intertwining during fall.

Due to the accumulation unit 60 and the second web forming unit 70 (a web forming step) as described above, a web W that contains a large amount of air and that is soft and swollen is formed. The web W accumulated on the mesh belt 72 is transported to the sheet forming unit 80.

In the example shown in FIG. 1, a moisture-adjusting unit 78 that adjusts the moisture in the web W is provided. The moisture-adjusting unit 78 is capable of adjusting the ratio between the amounts of the web W and water in the web W by adding water or steam to the web W.

The sheet forming unit 80 shapes (forms) the web W accumulated on the mesh belt 72 into a sheet S by pressurizing and heating the web W. In the sheet forming unit 80, because the mixture of the defibrated material and the additive mixed in the web W is heated, a plurality of fibers in the mixture can be bound by the additive (resin).

The sheet forming unit 80 is, for example, a heating roller (heater roller), a hot press molding machine, a hot plate, a warm air blower, an infrared heater, or a flash fixer unit. In the example shown, the sheet forming unit 80 includes a first binder unit 82 and a second binder unit 84, and each binder unit 82, 84 includes a pair of heating rollers 86. Because the binder units 82 and 84 are provided as the heating rollers 86 in this example, the web W can be continuously transported while being shaped into the sheet S, in contrast with a configuration in which the binder units 82 and 84 are provided as platy press apparatuses (flat press apparatuses). Incidentally, the number of heating rollers 86 is not particularly limited.

The cutter unit 90 cuts the sheet S formed by the sheet forming unit 80. In the example shown in FIG. 1, the cutter unit 90 includes a first cutter unit 92 that cuts the sheet S along a direction that intersects the transport direction of the sheet S and a second cutter unit 94 that cuts the sheet S along a direction substantially parallel to the transport direction. The second cutter unit 94, for example, cuts the sheet S that has passed through the first cutter unit 92.

In the foregoing manner, a cut-sheet type sheet S having a predetermined size is formed. The thus obtained cut sheet S is discharged to a discharge unit 96.

1.2. Arrangement

Figure 2:
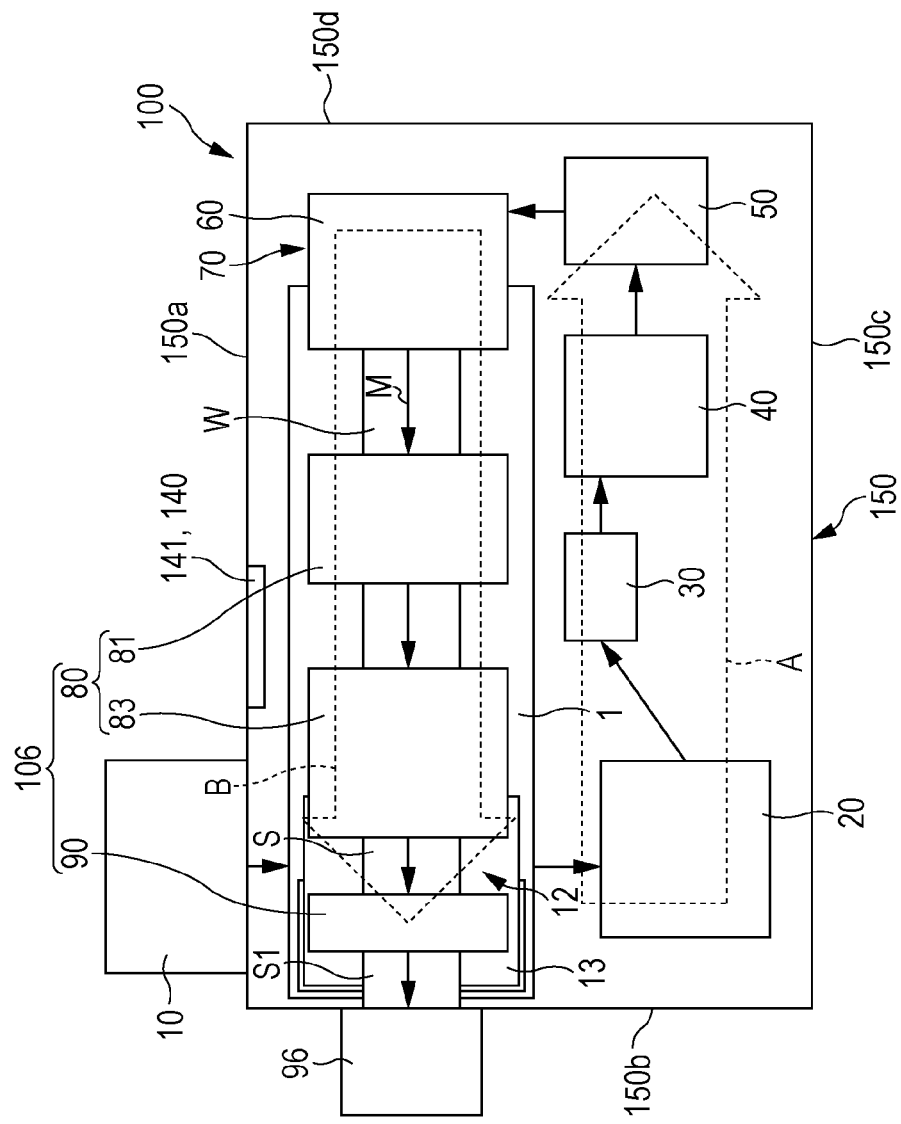
FIG. 2 is a schematic plan view of the sheet manufacturing apparatus according to the exemplary embodiment.
Figure 3:
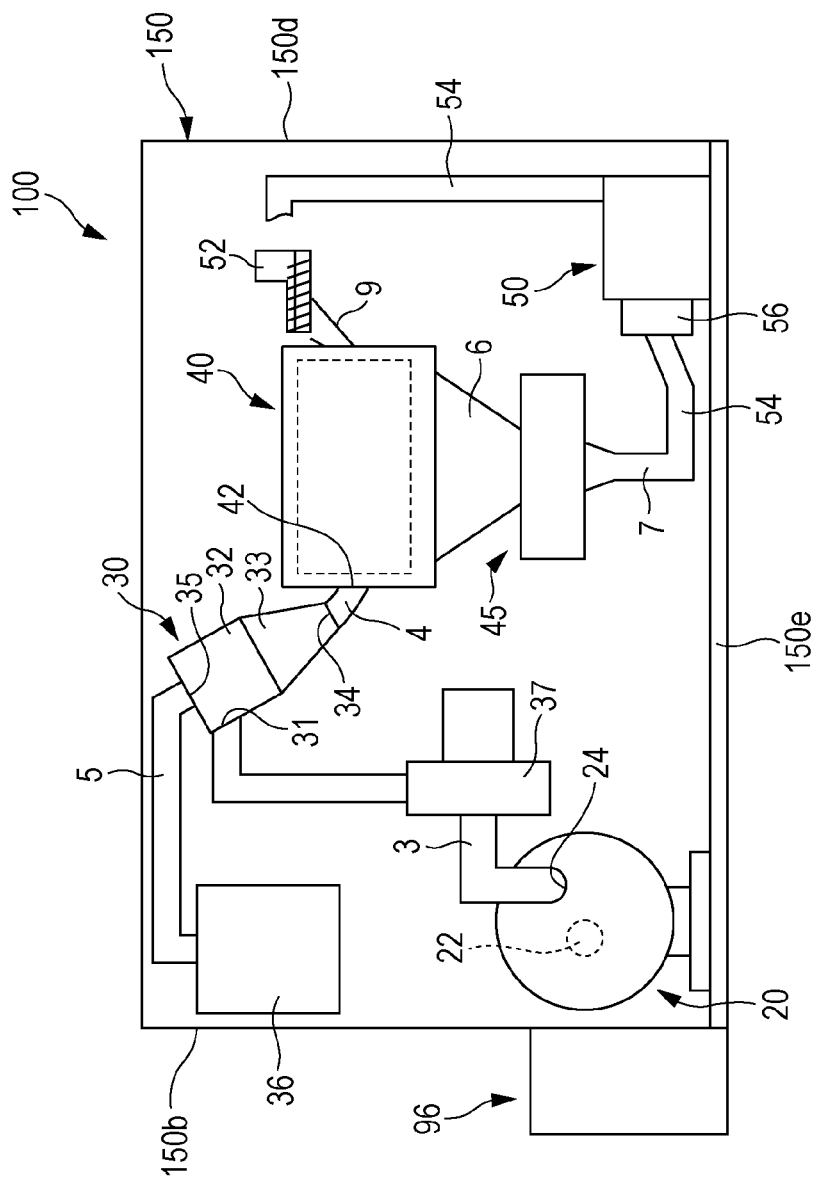
FIG. 3 is a schematic rear view of the sheet manufacturing apparatus according to the exemplary embodiment.
Figure 4:
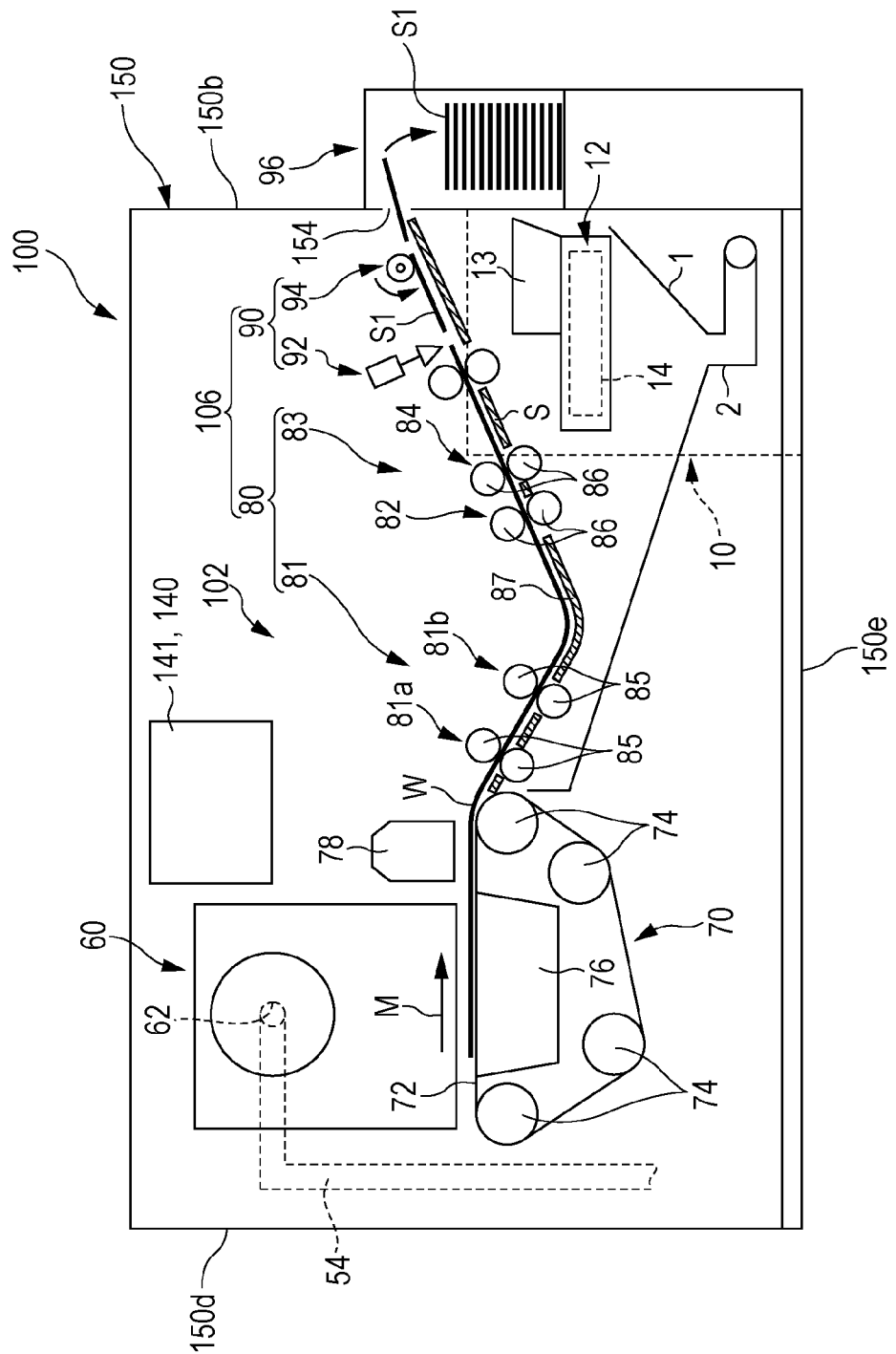
FIG. 4 is a schematic front view of the sheet manufacturing apparatus according to the exemplary embodiment.
Figure 5:
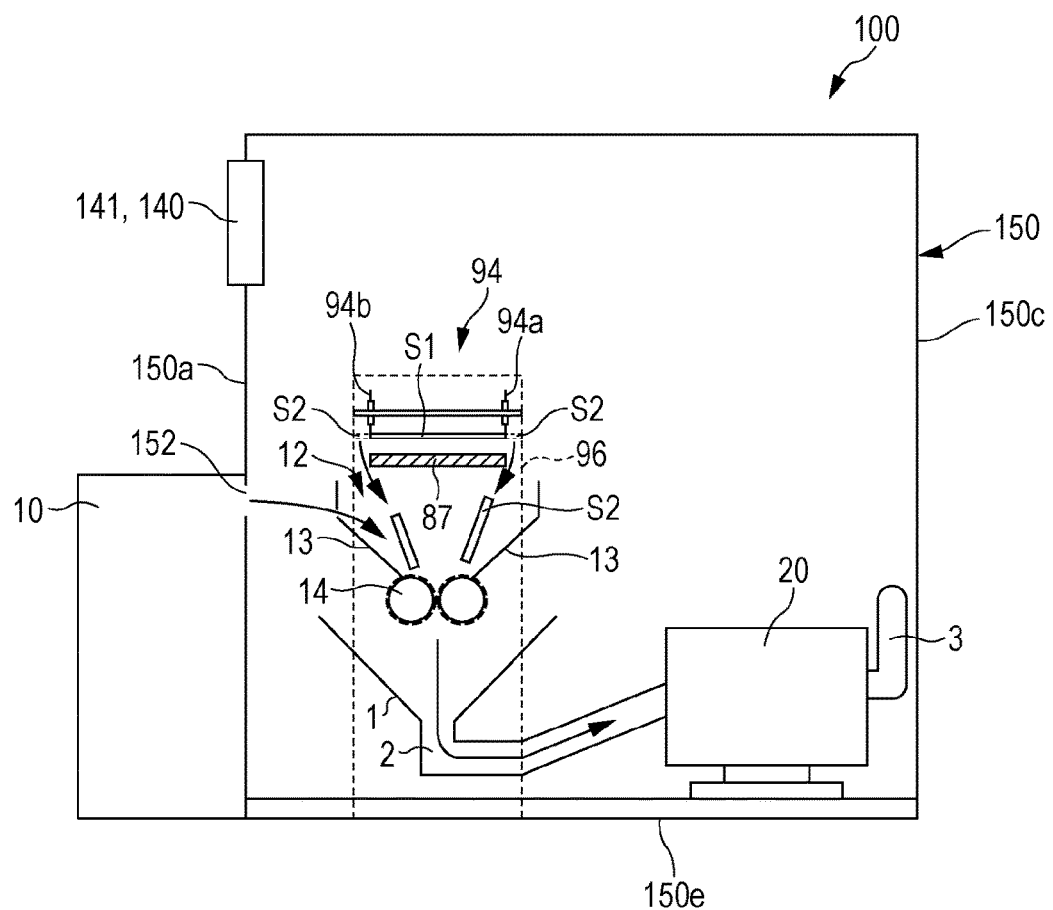
FIG. 5 is a schematic right side view of the sheet manufacturing apparatus according to the exemplary embodiment.

With reference to FIG. 2, arrangement of various process units in the sheet manufacturing apparatus 100 will be described. FIGS. 2 to 5 schematically show the sheet manufacturing apparatus 100 according to the exemplary embodiment. FIG. 2 is a plan view, FIG. 3 is a rear view, FIG. 4 is a front view, and FIG. 5 is a right side view of the sheet manufacturing apparatus 100. In FIGS. 2 to 4, for illustration of internal structures, a side wall at a near side in each drawing is omitted, and an arrangement of process units at the far side in each drawing is also omitted. Incidentally, the process units of the sheet manufacturing apparatus 100 shown in FIGS. 2 to 5 have already been described above in "1.1. Configuration" and redundant descriptions will be avoided below.

In FIG. 2, the side at which an operation unit 141 (a control unit 140) by which a user operates the sheet manufacturing apparatus 100 is disposed is a front side of the sheet manufacturing apparatus 100. When the side at which the operation unit 141 is positioned is the front side, the defibrator unit 20 is positioned at the rear side and the shaping unit 106 is positioned at the front side.

As shown in FIG. 2, the sheet manufacturing apparatus 100 has a casing 150 that does not contain either the supplying unit 10 or the discharge unit 96 and that has a substantially quadrangular shape in a plan view whose four sides are first to fourth side walls 150a to 150d. The first to fourth side walls 150a to 150d extend upward from a machine base 150e. The first side wall 150a provided on the front side is a front surface of the sheet manufacturing apparatus 100 and faces the third side wall 150c provided on the rear side. The second side wall 150b and the fourth side wall 150d are disposed so as to connect two opposite end portions of the first side wall 150a and two opposite end portions of the third side wall 150c.

The supplying unit 10 and the discharge unit 96 are provided outside the casing 150 and adjacent to the first side wall 150a and the second side wall 150b, respectively. In this exemplary embodiment, the casing 150 is rectangular in a plan view, with the first and third side walls 150a and 150c being longer than the second and fourth side walls 150b and 150d. The first to fourth side walls 150a to 150d are rectangular platy bodies having the same height and, therefore, the casing 150 has substantially the shape of a rectangular parallelepiped.

The supplying unit 10 holds a raw material and supplies the raw material to the coarse crusher unit 12. The supplying unit 10 is positioned at the first side wall 150a of the casing 150 of the sheet manufacturing apparatus 100. The supplying unit 10 is disposed adjacent to an external surface of the first side wall 150a and toward (near) the second side wall 150b. The discharge unit 96 holds cut sheets S1 formed by the shaping unit 106. The discharge unit 96 is positioned at the second side wall 150b continuous to the first side wall 150a of the casing 150 of the sheet manufacturing apparatus 100. The discharge unit 96 is disposed adjacent to an external surface of the second side wall 150b and toward the first side wall 150a. This arrangement of the supplying unit 10 and the discharge unit 96 on the continuous side walls is convenient for the user.

The sheet manufacturing apparatus 100 includes at least the coarse crusher unit 12 that coarsely crushes the raw material containing fibers into coarsely crushed pieces, the defibrator unit 20 that defibrates the coarsely crushed pieces provided by the coarse crusher unit 12 into a defibrated material, the second web forming unit 70 that accumulates the defibrated material provided by the defibrator unit 20 so as to form the web W, and the shaping unit 106 that shapes the web W provided by the second web forming unit 70 into cut sheets S1.

Furthermore, the shaping unit 106 includes the sheet forming unit 80 that includes a pressurization unit 81 that pressurizes the web W and a heater unit 83 that heats the web W pressurized by the pressurization unit 81. The shaping unit 106 further includes the cutter unit 90 that cuts the continuous sheet S heated by the heater unit 83.

The sheet manufacturing apparatus 100 has in front and rear portions thereof two transport lines A and B that transport the raw material or the sheet S. As for the front-side transport line B, the set of the accumulation unit 60 and the second web forming unit 70, the sheet forming unit 80 (the pressurization unit 81 and the heater unit 83), and the cutter unit 90 are disposed in order along the first side wall 150a side from the fourth side wall 150d toward the second side wall 150b. A downstream-side end portion of the front-side transport line B is connected toward the discharge unit 96.

As for the rear-side transport line A, the defibrator unit 20, the classifier unit 30, the screening unit 40, and the mixer unit 50 are disposed in order along the third side wall 150c side from the second side wall 150b to the fourth side wall 150d. This two-row arrangement of the front and rear-side transport lines allows a shorter length of the entire apparatus than a single-row transport line arrangement. Therefore, the sheet manufacturing apparatus 100 can be provided in such a size as to be placed in a limited space such as an office or a warehouse.

As shown in FIGS. 2, 4 and 5, the coarse crusher unit 12 is positioned vertically below the shaping unit 106. Because the coarse crusher unit 12 is disposed in a space below the shaping unit 106, waste space can be made as small as possible and therefore the installation area of the sheet manufacturing apparatus 100 can be minimized. The raw material supplied from the supplying unit 10 is supplied to the defibrator unit 20 of the rear-side transport line A via the coarse crusher unit 12 disposed vertically below the shaping unit 106.

The order of the processes performed by the process units is as described in "1.1. Configuration", and is indicated in FIG. 2 by solid-line arrows that connect the process units (pipes and the like are omitted from the illustration). The process units will be described in the order indicated by the arrows. When the raw material is supplied from the supplying unit 10 into the casing 150, the raw material is crushed into coarsely crushed pieces by the coarse crusher unit 12 provided vertically below the shaping unit 106 and then is sent to the rear-side transport line A. The coarsely crushed pieces are transported into the defibrator unit 20 disposed at the second side wall 150b side and are defibrated by the defibrator unit 20 into a defibrated material. The defibrated material is classified into the first and second classified materials by the classifier unit 30 disposed near the center of the casing 150. The first classified material is screened into the first screened material by the screening unit 40. The first screened material is mixed with the additive that contains a resin by the mixer unit 50. The obtained mixture is sent to the front-side transport line B. Then, in the front-side transport line B, the mixture is transported to and unraveled by the accumulation unit 60 provided at the fourth side wall 150d side, and is accumulated to form the web W in the second web forming unit 70 provided vertically below the accumulation unit 60. The web W is transported to the sheet forming unit 80, in which the web W is shaped into a continuous sheet S. The continuous sheet S is transported to the cutter unit 90 provided at the second side wall 150b and is cut thereby into cut sheets S1. The cut sheets S1 are discharged through the discharge opening 154 into the discharge unit 96 provided outside the casing 150.

Although the exemplary embodiment has been described in conjunction with the example in which the two-row transport line is employed, the transport line may be provided as a transport line of three or more rows or may also be a single-row transport line that extends in the front/rear direction.

1.3. Cutter Unit

With reference to FIGS. 4 and 5, the cutter unit 90 will be described in detail.

The shaping unit 106 includes the cutter unit 90 provided at a location that is within the casing 150 and that is at the second side wall 150b side. The cutter unit 90 includes a first cutter unit 92 and a second cutter unit 94.

The first cutter unit 92 cuts the continuous sheet S transported from the sheet forming unit 80 in a cutting direction orthogonal to the transport direction M of the continuous sheet S. The first cutter unit 92 includes a blade portion whose lower end is formed as a cutting edge that cuts the continuous sheet S and a cutting/driving unit that raises and lowers the blade portion relative to the continuous sheet S. According to a command from the control unit 140, the cutting/driving unit lowers the blade portion to the continuous sheet S at predetermined intervals to cut off a predetermined cut sheet S1 length and raises the blade portion after the cutting. The length of the cut sheet S1 at this stage is equal to the length of the cut sheet S1 as a final product.

In this specification, the "width of the sheet" means the length of the sheet S, S1 in the direction orthogonal to the transport direction M and the "length of the sheet" is the length of the sheet S, S1 in a direction parallel to the transport direction M.

The cutting edge of the blade portion extends over the entire width of the continuous sheet S in the direction orthogonal to the transport direction M. The first cutter unit 92 is of a so-called guillotine cutter system in this example but may employ various known cutting mechanisms for papers, such as a rotary cutter system that uses a disc-shaped blade that rotates.

The second cutter unit 94 is positioned at the downstream side of the first cutter unit 92 in the transport direction M. The second cutter unit 94 further cuts the cut sheet S1 having been cut by the first cutter unit 92, in a direction along the transport direction M. Specifically, the second cutter unit 94 cuts opposite side end portions of the cut sheet S1 which extend in the transport direction. In the case where the first cutter unit 92 is not provided (where the product is not a cut sheet but a continuous sheet that is wound into a roll), opposite side end portions of a continuous sheet S which extend in the transport direction may be cut. The second cutter unit 94, sometimes called slitter, cuts two opposite end portions of the cut sheet S1 in the width direction so that the obtained width equals a predetermined width of the cut sheet S1 as a final product.

As shown in FIG. 5, the second cutter unit 94 cuts the two opposite end portions of the cut sheet S1 in the width direction by using cutting blades that are disposed at two locations near the two opposite end portions of the cut sheet S1 in the width direction. The second cutter unit 94 includes a first side end cutter unit 94a and a second side end cutter unit 94b.

Cutting blades of the first side end cutter unit 94a and the second side end cutter unit 94b are disc-shaped rotary blades as shown in FIG. 4. More specifically, two cutting blades are fixed on the same rotation shaft and rotated to cut the cut sheet S1 so as to always provide a constant width of the cut sheet S1 as shown in FIG. 5. The first side end cutter unit 94a and the second side end cutter unit 94b continuously cuts the cut sheet S1 that is being transported in the transport direction M. Note that although the cutting blades of the second cutter unit 94 in this example are rotary blades, this is not restrictive but any suitable known cutters for use in slitters may be used.

The side end portions of the cut sheet S1 which extend in the transport direction are portions that become no longer needed in the processing of the continuous sheet S into the final-product cut sheet S1 and, specifically, portions from the two opposite ends of the continuous sheet S in the width direction to the first side end cutter unit 94a and to the second side end cutter unit 94b. The side end portions are cut off in order to trim the shape of the two opposite ends of the cut sheet S1 and also because the grammage of the side end portions of the cut sheets S1 tends to be less than the grammage needed for the final products. However, since the side end portions do not have any problems about the fibers of the defibrated material themselves, remnants S2 (FIG. 5) cut off from the sheet S1 can be sufficiently reused as a raw material of the continuous sheet S by returning the remnant S2 to the defibrator unit 20 for the series of processes.

In order to efficiently reuse the remnants S2, at least a portion of the coarse crusher unit 12 is positioned vertically below the cutter unit 90. Due to the provision of the coarse crusher unit 12 vertically below the cutter unit 90, the remnants S2 produced in the cutter unit 90 can be introduced into the coarse crusher unit 12 by gravity. More concretely, the coarse crusher unit 12 has a guide 13 that is provided vertically below the second cutter unit 94. The guide 13 is formed by a frame made up of platy parts and expands toward its tip. The guide 13 guides the falling remnants S2 to the coarse crusher blade 14 so that the remnants S2 slide down. The guide 13 has in a side facing a supply opening 152 of the supplying unit 10 an opening for receiving the raw material supplied from the supplying unit 10 to the coarse crusher unit 12.

The coarse crusher unit 12 is positioned vertically below the heater unit 83 and the cutter unit 90. This disposal of the coarse crusher unit 12 facilitates performing maintenance of the pressurization unit 81 even though the coarse crusher unit 12 is disposed vertically below the shaping unit 106. Because the pressurization unit 81 has a pressurization mechanism that is larger and heavier than the heater unit 83 and the cutter unit 90, the disposal of the pressurization mechanism at a lower side of the web W makes it easy to pull out the pressurization mechanism, for example, to the outside of the casing 150, and thus facilitates performing maintenance.

The coarsely crushed pieces of the remnants S2 coarsely crushed by the coarse crusher unit 12 freely fall downward from the coarse crusher unit 12, together with coarsely crushed pieces of the raw material supplied from the supplying unit 10, so that the coarse crushed pieces are received by the hopper 1 and gathered into the pipe 2 and are transported to the defibrator unit 20 through the pipe 2 due to air streams. Because the remnants S2, due to their low grammage, are not sufficiently pressurized by the pressurization unit 81, the remnants S2 can be defibrated by the defibrator unit 20 even if they are not coarsely crushed. However, if the remnants S2 are coarsely crushed similarly to the raw material, the remnants S2 can be more certainly defibrated by the defibrator unit 20. Furthermore, if the remnants S2 are made coarsely crushed pieces, the remnants S2 can be easily transported by an air stream produced by the defibrator unit 20.

The coarse crusher unit 12 is a unit for breaking the raw material supplied from the supplying unit 10 into small pieces. If the coarse crusher unit 12 is used also to break the remnants S2 into small pieces, it is not necessary to separately provide a shredder for remnants S2 and therefore it is possible to achieve low cost, space saving, and energy saving.

1.4. Receiver Unit

A receiver unit is provided vertically below the pressurization unit 81, the heater unit 83, and the cutter unit 90. In the example shown in FIGS. 4 and 5, the receiver unit has been formed by stretching (extending) a hopper 1. The hopper 1 (the receiver unit) guides paper powder produced in the shaping unit 106 to the defibrator unit 20 side.

As for the web W accumulated in the second web forming unit 70, the two opposite side end portions are accompanied by a defibrated material that is so low in grammage as to be incapable of maintaining a shape as the web W despite being pressurized by the pressurization unit 81 and therefore become paper powder. According to the related art, a part of this paper powder is transported together with the web W and another part separates from the web W to remain in an intermediate portion of the transport path and becomes lumps of paper powder. Then, if such lumps of paper powder are left remaining, lumps can mix into the web W some time, impeding the transport of the continuous sheet S or producing a speckled pattern in the cut sheet S1 as a final product.

As shown in FIGS. 4 and 5, in the pressurization unit 81, the heater unit 83, and the cutter unit 90, a platy guide 87 that at least has substantially the same width as the product cut sheet S1 is provided under the web W and the continuous sheet S. The web W or the continuous sheet S is transported by a plurality of rollers such as pressure rollers 85 and heating rollers 86. At that time, paper powder adjacent to portions of the web W or the continuous sheet S which are wider than the platy guide 87, more specifically, adjacent to the two opposite ends of the wider portions, falls outside the guide 87.

The hopper 1 (the receiver unit) has a greater width than the platy guide 87 and therefore is capable of receiving the falling paper powder. The hopper 1 (the receiver unit) extends in the downstream side of the second web forming unit 70 in which paper powder occurs, that is, extends vertically below the pressurization unit 81, the heater unit 83, and the cutter unit 90. The hopper 1 (the receiver unit) is inclined downward toward the pipe 2 and serves as a chute down which the paper powder slides. The paper powder is then transported through the pipe 2 to the defibrator unit 20.

Because the hopper 1 (the receiver unit) as described above is provided, the paper powder produced in the shaping unit 106 can also be reused. Furthermore, because the paper powder is guided to the hopper 1 (the receiver unit), transport impediment or a speckled pattern in the cut sheet S1 can be prevented.

Note that since the paper powder can be easily defibrated, the direct transport of the paper powder from the hopper 1 (the receiver unit) to the defibrator unit 20 in the exemplary embodiment is not restrictive but a receiver unit may be provided so as to guide the paper powder to the coarse crusher unit 12. In that case, the paper powder is guided by the receiver unit to the coarse crusher unit 12, coarsely crushed by the coarse crusher unit 12 to fall into the hopper 1, and then transported to the defibrator unit 20.

The paper in this specification includes various kinds of paper such as a paper formed into a thin sheet shape from a raw material such as pulp or waste paper. Examples of the paper in this specification include recording sheets for use for writing and printing, wall paper, wrapping paper, colored paper, drawing paper, Kent paper, etc. The non-woven fabric in this specification includes a non-woven fabric thicker and lower in strength than paper and, specifically, a general non-woven fabric, fiber board, tissue paper (cleaning tissue paper), paper towel, a cleaner, a filter, a liquid (waste ink or oil) absorbent, a sound absorbing material, a heat insulator, a cushioning material, a mat, etc. Incidentally, the raw material may be vegetable fiber such as cellulose, chemical fiber such as fibers of PET (polyethylene terephthalate), polyester, etc., animal fiber such as wool or silk.

According to the invention, the features and effects mentioned in the subject application may be partly omitted and the embodiments and modifications may be combined in various manners.

The present invention includes configurations that are substantially the same as the configuration described above in conjunction with the exemplary embodiments (configurations that are the same in function, method, and result or the same in purpose and effect as the foregoing configuration). Furthermore, the invention encompasses configurations obtained by replacing unessential portions of the configurations described in conjunction with the exemplary embodiments with different portions. Further, the invention encompasses configurations that achieve the same operation and effects or accomplish the same purposes as the configurations described above in conjunction with the exemplary embodiments. Still further, the invention encompasses configurations obtained by adding known technologies to the configurations described above in conjunction with the exemplary embodiments.

The entire disclosure of Japanese Patent Application No. 2015-044374, filed Mar. 6, 2015 is expressly incorporated by reference herein.

What is claimed is:

1. A sheet manufacturing apparatus comprising:
   A crusher unit configured to coarsely crush raw material that contains fiber into coarsely crushed pieces;
   A defibrator unit configured to defibrate coarsely crushed pieces into defibrated material;
   A web forming unit configured to form a web by accumulating defibrated material; and
   A shaping unit configured to form a sheet from the web, wherein the sheet manufacturing apparatus is structured such that the crusher unit is positioned vertically below the shaping unit, the position of the crusher unit allowing for waste material produced by the shaping unit when forming the sheet to be directly fed to the crusher unit for reuse by the sheet manufacturing apparatus and wherein the sheet manufacturing apparatus is sized such that the crusher unit, the defibrator unit, the web forming unit, and the shaping unit are disposed inside a casing of the sheet manufacturing apparatus.

2. The sheet manufacturing apparatus according to claim 1, wherein:

the shaping unit includes a cutter unit configured to cut off a side end portion of the sheet which extends in a transport direction in which the sheet is transported; and at least a portion of the crusher unit is positioned vertically below the cutter unit.

3. The sheet manufacturing apparatus according to claim 1, wherein the shaping unit includes:

a pressurization unit configured to pressurize the web;

a heater unit configured to heat the web pressurized by the pressurization unit; and a cutter unit configured to cut the sheet obtained by heating the web by the heater unit, and wherein the crusher unit is positioned vertically below the heater unit and the cutter unit.

4. The sheet manufacturing apparatus according to claim 3, further comprising a receiver unit provided vertically below the pressurization unit, the heater unit, and the cutter unit, wherein the receiver unit configured to guide paper powder produced in the shaping unit to a defibrator unit side.

5. The sheet manufacturing apparatus according to claim 1, further comprising:

a supplying unit configured to hold the raw material and supply the raw material to the crusher unit; and a discharge unit configured to hold the sheet formed by the shaping unit, and wherein the supplying unit is positioned at a first side wall of the casing of the sheet manufacturing apparatus, and wherein the discharge unit is positioned at a second side wall continuous to the first side wall of the casing of the sheet manufacturing apparatus.

6. The sheet manufacturing apparatus according to claim 1, wherein in plan view a transport direction of the raw material supplied to the crusher unit from a supplying unit configured to hold the raw material and supply the raw material intersects a transport direction of the formed sheet that is transported to a discharge unit configured to hold the sheet formed by the shaping unit.

7. The sheet manufacturing apparatus according to claim 6, wherein in plan view the transport direction of the raw material and the transport direction of the formed sheet intersect at a portion that overlaps a guide member of the crusher unit.

8. The sheet manufacturing apparatus according to claim 1, wherein the crusher unit includes a guide member configured to move the waste material and a course crusher blade configured to coarsely crush the waste material, the guide member being disposed vertically above the course crusher blade so as to move the waste material via gravity to the course crusher blade.

9. The sheet manufacturing apparatus according to claim 1, wherein the crusher unit includes a guide member configured to move the waste material to a portion of the portion of the crusher unit that is configured to coarsely crush the waste material and a hopper unit that is located vertically below the guide unit so as collect the waste material that has been coarsely crushed, wherein in plan view the guide unit and the hopper unit overlap.

10. The sheet manufacturing apparatus according to claim 9, wherein the hopper unit is connected to the defibrator unit to so as to provide the coarsely crushed waste material to the defibrator unit.

11. The sheet manufacturing apparatus according to claim 1, wherein the shaping unit including a blade cutter unit, the blade cutter unit being disposed vertically above a guide member of the crusher unit that is configured to move the waste material via gravity to the portion of the crusher unit that is configured to coarsely crush the waste material, wherein in plan view the blade cutter unit and the guide unit overlap.

* * * * *